(12) United States Patent
Klimenko

(10) Patent No.: US 6,755,707 B1
(45) Date of Patent: Jun. 29, 2004

(54) INFLATABLE SLEDS, WATERCRAFT, AND OTHER OBJECTS

(75) Inventor: Konstantin Klimenko, Los Angeles, CA (US)

(73) Assignee: Sevylor, Inc., Los Angeles, CA (US)

( * ) Notice: Subject to any disclaimer, the term of this patent is extended or adjusted under 35 U.S.C. 154(b) by 0 days.

(21) Appl. No.: 10/119,870

(22) Filed: Apr. 10, 2002

Related U.S. Application Data

(60) Provisional application No. 60/304,701, filed on Jul. 11, 2001.

(51) Int. Cl.[7] .............................................. B63B 35/58
(52) U.S. Cl. ........................ 441/40; 114/345; 114/357
(58) Field of Search ............................ 441/42, 40, 35, 441/65, 66; 114/345, 347, 357

(56) References Cited

U.S. PATENT DOCUMENTS

| | | | | |
|---|---|---|---|---|
| 2,752,977 A | * | 7/1956 | Clarke et al. ................. 383/90 |
| 4,480,579 A | * | 11/1984 | Masters ....................... 114/347 |
| 4,914,766 A | * | 4/1990 | Moore ............................ 5/644 |
| 5,632,071 A | * | 5/1997 | Maunder .................... 24/580.1 |
| 5,647,784 A | * | 7/1997 | Moran .......................... 441/65 |
| D425,165 S | | 5/2000 | Klimenko | |
| 2001/0037610 A1 | * | 11/2001 | Davis ............................ 52/12 |

* cited by examiner

Primary Examiner—Stephen Avila
(74) Attorney, Agent, or Firm—Dean W. Russell; Kilpatrick Stockton LLP

(57) ABSTRACT

Methods and techniques for constructing inflatable objects are detailed herein. Objects made according to these techniques may include both plastic material (such as polyvinyl chloride) and fabric connected indirectly via an interfacing material including the two. The objects additionally may include a fastening system including opposed, spatially-alternating loops through an article is placed. Use as inflatable sleds may (although need not necessarily) be the intended function of the objects.

11 Claims, 6 Drawing Sheets

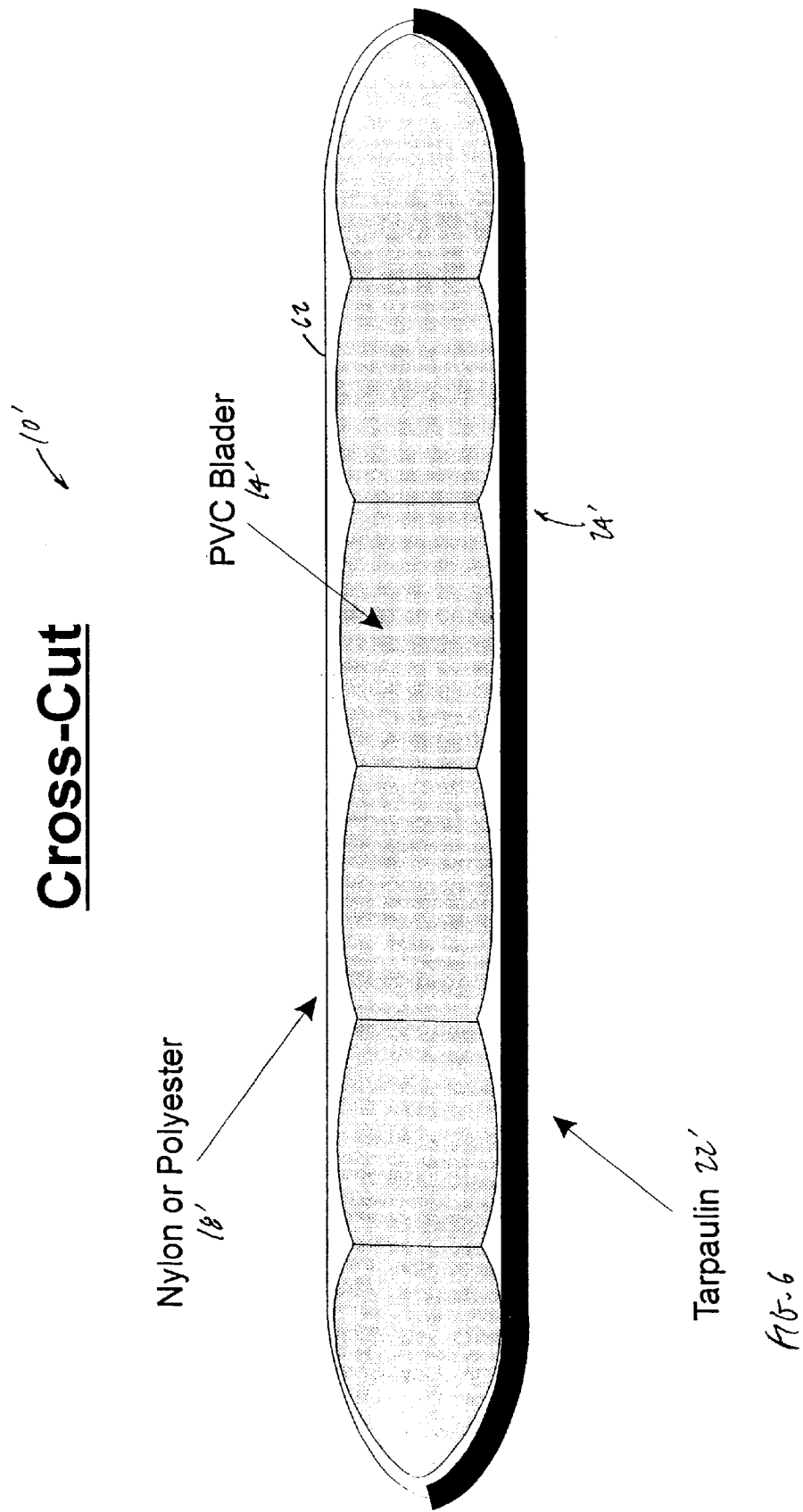

INFLATABLE SLEDS, WATERCRAFT, AND OTHER OBJECTS

REFERENCE TO PROVISIONAL APPLICATION

This application is based on and hereby refers to U.S. Provisional Patent Application Serial No. 60/304,701, filed Jul. 11, 2001, having the same title as appears above.

FIELD OF THE INVENTION

This invention relates to items having inflatable portions and more particularly to inflatable sleds, watercraft, and other objects and methods and techniques for their construction.

BACKGROUND OF THE INVENTION

Numerous inflatable objects, including products intended for pleasure use in swimming pools or to be towed behind watercraft, are formed of plastics material such as polyvinyl chloride (PVC). Frequently, inflatable chambers or containers are formed by connecting multiple sheets of PVC and sealing the connected portions. Such sealing often occurs through welding, using ultrasonic or radio frequency (RF) energy (or otherwise), the relevant portions of the sheets.

PVC generally welds well to PVC and certain other plastics. It does not, however, typically weld well to numerous other materials such as fabrics. Sewing PVC to fabric similarly produces poor results, as stitching through PVC, particularly when it is in thin-sheet form, may cause the PVC to rip or otherwise lose its ability to retain air.

In some instances, inflating chambers of recreational objects to substantial pressures and covering them with shells might desirably enhance the rigidity of the overall products. The shells might not contain ordinary zippers, however, at least in part because the substantial pressures impinging upon the zippers could deform them and inhibit satisfactory operation (particularly in cold temperatures). Although conceivably heavy-duty zippers could be employed, such zippers also might not work correctly and, at minimum, would add significant expense to the cost of constructing the objects.

SUMMARY OF THE INVENTION

The present invention provides alternative methods and techniques for constructing inflatable objects. Objects made according to the invention may include not only PVC and fabric, but also an interfacing material of PVC and meshed fabric. In constructing these objects, the PVC may be welded to the interface and the fabric sewn to it, permitting use of both PVC and fabric in the same object.

Additionally optionally included in some products of the present invention are opposed, spatially-alternating loops through which a rope, stick, or other article may be placed. The loop sets, together with the article placed through them, provide a low-cost fastening system as an alternative to heavy-duty zippers. Preferably designed to be sewn to fabric components of the objects, the loops are especially (although not exclusively) useful in constructing inflatable sleds intended for use in cold weather.

By covering most or all of an inflatable bladder or chamber with a fabric shell, a relatively rigid object may be formed. Attaching the chamber to the shell using the interfacing material facilitates construction of the object. Certain fittings made of PVC or similar material, which otherwise might be connected to the inflatable chamber were it not covered by the shell, may instead likewise be connected to the exterior of the shell using the interfacing material.

It thus is an object of the present invention to provide techniques and methods for constructing inflatable objects.

It is an additional object of the present invention to provide components of inflatable objects in which PVC and fabric need not be welded together directly.

It is a further object of the present invention to provide methods of attaching PVC and fabric, such methods including use of interfacing material formed of PVC and meshed fabric.

It is yet another object of the present invention to provide fastening systems as alternatives to using heavy-duty zippers for products including inflatable portions.

It is also an object of the present invention to provide inflatable sleds and watercraft and methods and techniques for constructing them.

Other objects, features, and advantages of the present invention will be apparent to those skilled in the art with reference to the remaining text and the drawings of this application.

BRIEF DESCRIPTION OF THE DRAWINGS

FIG. 6 is a partially schematicized, cross-sectional view of a portion of the object of FIG. 4.

DETAILED DESCRIPTION

Figure 1:
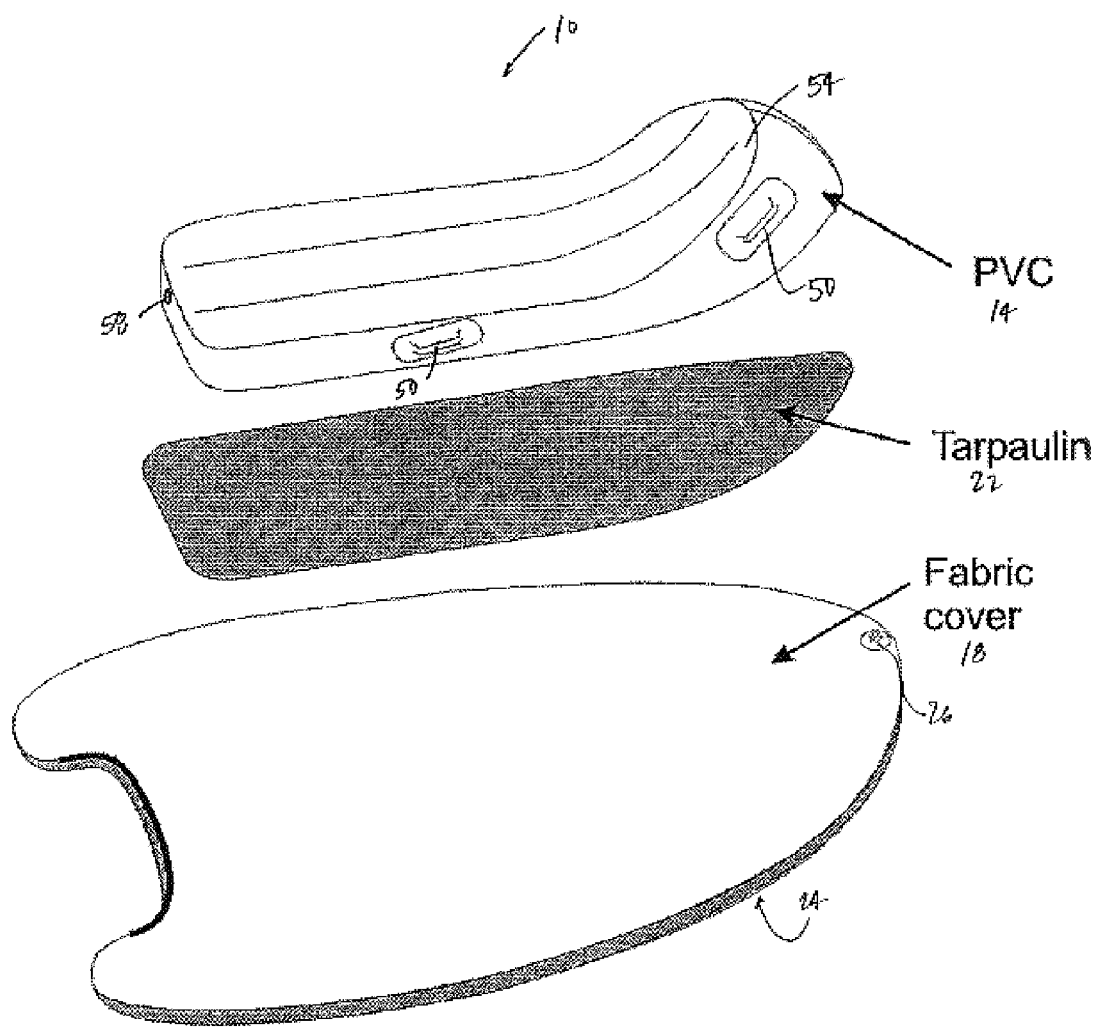
FIG. 1 is an exploded perspective view of selected components of an inflatable object of the present invention.

Detailed in FIG. 1 is an exemplary object 10 of the present invention. Object 10 depicted in FIG. 1 is especially suitable for use as a snow sled and is configured as such. The constructions and techniques of the invention are useful for and applicable to other items, however, and are not limited either to snow sleds or to the object 10 illustrated in FIG. 1.

As shown, object 10 comprises chamber 14, cover 18, and interface 22. Chamber 14 typically is inflatable (with air or other appropriate fluid) and made of plastic material substantially impervious to passage of the inflation fluid. PVC is a preferred choice of material from which chamber 14 is formed, although those skilled in the art will recognize that other materials may be used instead. Likewise, although only one chamber 14 is shown in FIG. 1, object 10 may include more than one inflatable portion.

Cover 18 may form the base of object 10, providing (among other things) the lower surface 24 of object 10 bearing on the snow, ice, ground, water, or other surface which the object 10 contacts in use. Cover 18 hence advantageously is formed of heavy-duty fabric such as (but not necessarily) polyester or nylon designed to withstand substantial frictional-contact wear. Although materials other than fabric may be used for cover 18, the cover 18 typically is not made of PVC sheets, for example, as PVC tends to tear or break when subjected to certain types of frictional contact. Cover 18 additionally surrounds and houses much of chamber 14, principally to protect the material of chamber 14 in use from undesired contact with the ground or other surfaces and to enhance the overall rigidity of object 10.

Not illustrated in FIG. 1 are various fins, rudders, or other bearing materials that may be attached to or incorporated into lower surface 24 of object 10. Such fins, rudders, and other devices may improve the handling characteristics or performance of object 10 as a sled or other product, but need not necessarily form part of object 10. Likewise not illustrated in FIG. 1 are various fittings (such as but not necessarily hand grips) optionally included with cover 18. FIG. 1 does, however, depict ring 26, which if present may be used to attach a rope or line for pulling object 10 forward.

Interface 22 facilitates connection of chamber 14 and cover 18. PVC and conventional fabrics do not adhere well when common techniques for welding plastics are employed. Likewise, although conventional fabrics may be sewn successfully to certain other materials, PVC typically is not one of them. Indeed, the PVC sheets often used in creating inflatable recreational products are likely to rip or lose their air-retaining capacity if subjected to sewing.

Accordingly, interface 22 constitutes means for connecting chamber 14 and cover 18 indirectly. Referred to in FIG. 1 as a "tarpaulin," interface 22 preferably comprises a combination of PVC and meshed polyester (or nylon) fabric. Such interface 22 may be formed by melting the PVC so that it flows around the strands of the meshed fabric, effectively adhering to itself. Indeed, in some versions of object 10, interface 22 is created by placing a layer of PVC on each side of a fabric layer and then heating (at least) the PVC. Doing so effectively forms a composite structure as the PVC flows around the strands of the meshed fabric and adheres to other PVC.

Figure 2:
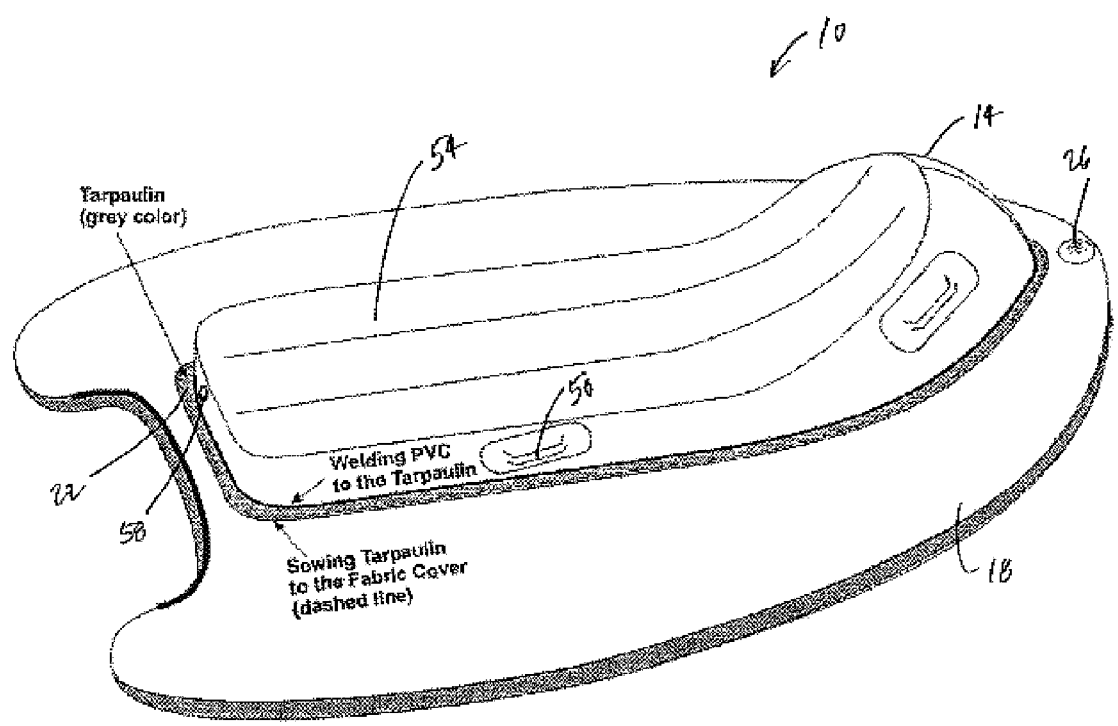
FIG. 2 is a perspective view of the components of the object of FIG. 1.

In use, interface 22 indeed may be welded to chamber 14 and sewn to cover 18, thus connecting the two without directly welding or sewing them together. FIG. 2 illustrates an exemplary result of this connection, producing an object 10 in the form of a sled. Use of interface 22 is not limited to sleds, however, but rather may occur whenever adequate to facilitate connection of a plastic material to a fabric.

Figure 3:
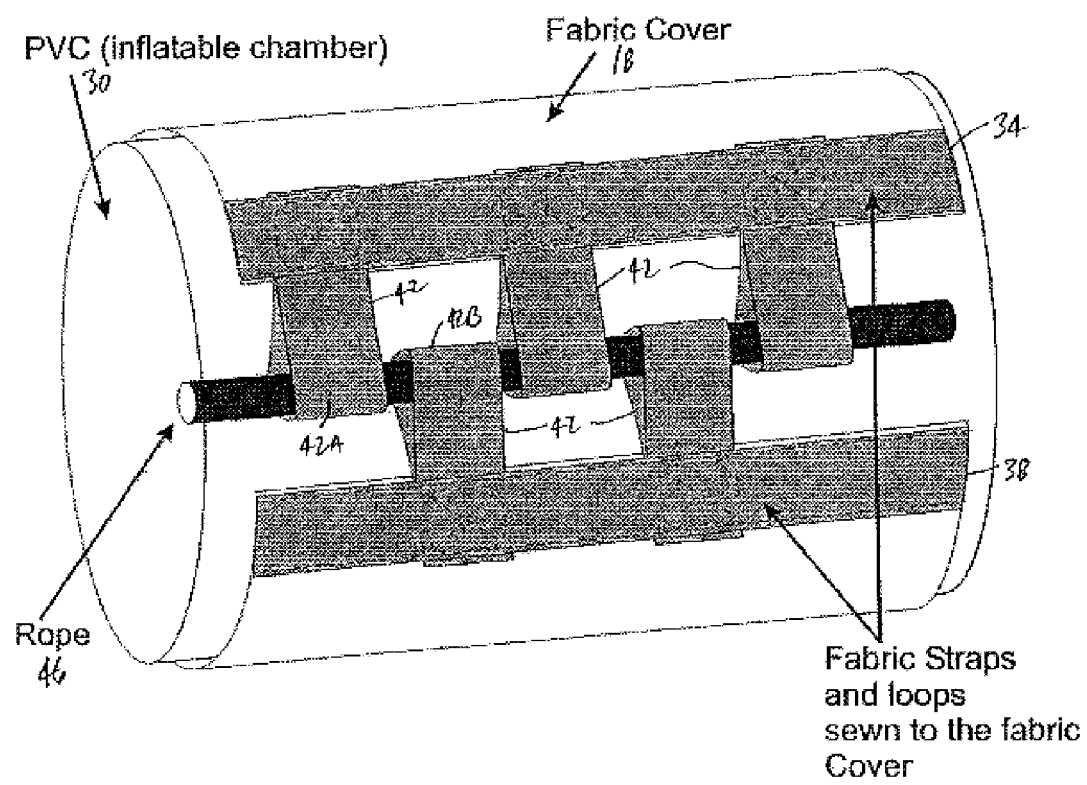
FIG. 3 is a schematicized view of a fastening system of the present invention useful in connection with objects including (but not limited to) that of FIG. 1.

FIG. 3 illustrates, somewhat schematically, another aspect of the present invention. In it, cover 18 is depicted as at least partially enclosing or surrounding an inflatable component 30, consistent with the description of the exemplary object 10 previously provided. In some embodiments of the invention, inflatable component 30 is the same as inflatable chamber 14. Particularly when object 10 is used in cold weather (as a sled, for example), the combination of inflation pressure of component 30 and the low temperature could inhibit successful use of, for example, many zippers with cover 18. (Indeed, at sufficiently high inflation pressure and low temperature, some zippers are likely to break and hence malfunction.) Nevertheless, being able to access and, if necessary, remove component 30 from cover 18 may be desirable in some circumstances, as when component 30 requires repair or replacement.

Thus, the invention optionally also contemplates attaching one or more loops to abutting edges or other portions of cover 18. FIG. 3 shows, as an example, two such edges 34 and 38. Sewn (or otherwise attached) to each edge 34 and 38 is a set of one or more loops 42, with their respective receiving portions 42A and 42B able to be offset spatially in use. Viewed from left to right in FIG. 3 are multiple loops 42, with receiving portions 42A (for loops 42 attached to edge 34) alternating with receiving portions 42B (for loops 42 attached to edge 38).

Received by portions 42A and 42B is rope 46, which if its ends are knotted or tied provides a zipper-less assembly for fastening edges 34 and 38 of cover 18. Of course, those skilled in the art will recognize that articles other than rope 46 (such articles including but not limited to an appropriately-configured stick or rod) may be used instead, and that loops 42 may be configured or numbered differently than as illustrated in FIG. 3. Generally, however, this portion of the invention mandates at least one retainer being attached to each of two opposing portions of cover 18 so that the retainers likewise oppose and are offset (or offsettable) spatially to receive an elongated object seriatim when the object is slid into the retainers. Such a system is particularly useful for sleds of the present invention, as its fastening capabilities are not significantly adversely affected in many high-pressure, low-temperature situations.

Any of chamber 14, cover 18, or interface 22, finally, may include one or more fittings. FIGS. 1–2 illustrates fittings 50 present on exterior 54 of chamber 14. Although the illustrated fittings 50 are hand grips, alternative or additional fittings 50 may be present. FIGS. 1–2 also show valve 58 for inflating or deflating (or both) chamber 14. Valve 58 may be a simple plugged opening, a Boston valve, or any other suitable device, and more than the single valve 58 shown in FIGS. 1–2 may be employed as desired.

Figure 4:
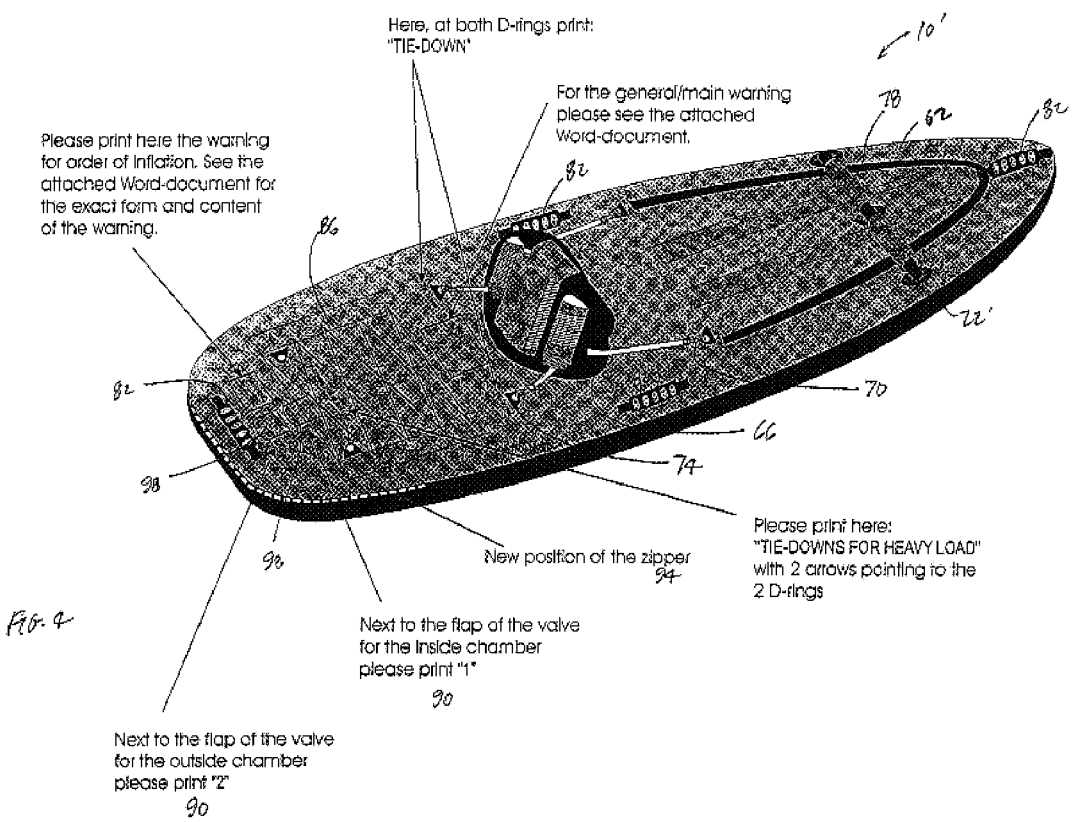
FIG. 4 is a perspective view of an alternative object of the present invention.
Figure 5:
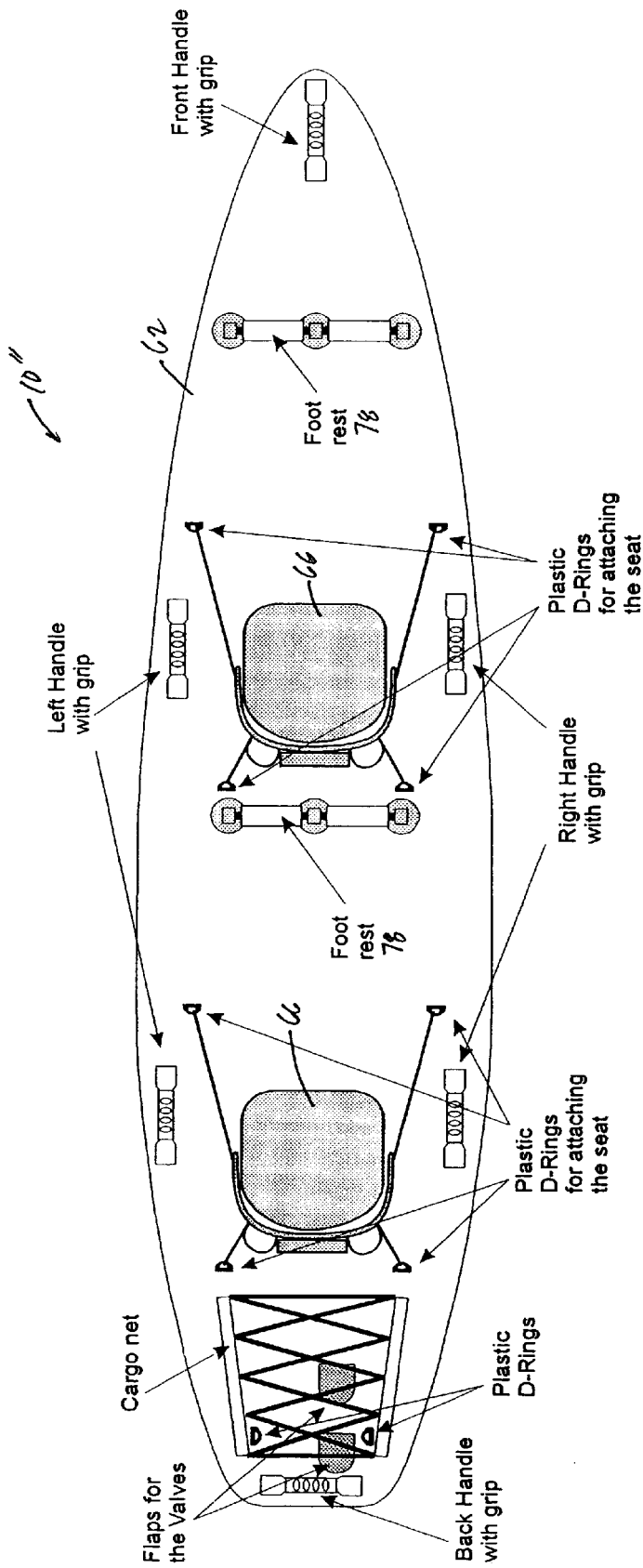
FIG. 5 is a top plan view of an object similar to that of FIG. 4.

FIGS. 4 and 6 illustrate an alternative object 10' of the present invention. As shown in these drawings, object 10' is a watercraft, and more particularly a flat-topped boat referred to herein as a "deck kayak." However, as noted earlier in connection with object 10, object 10' too is exemplary of products consistent with the present invention and need not be configured identically as depicted in FIGS. 4–6.

FIG. 6, especially, details a preferred structure of object 10'. Included as part of this preferred object 10' are one or more inflatable chambers 14', cover 18' (preferably, but not necessarily, made of nylon or polyester), and material 22', which may be formed if desired in the same manner as interface 22 is created. Cover 18' typically surrounds most or all of chambers 14' to protect the chambers 14' in use. Chambers 14' additionally may be removable from within cover 18' if desired.

Further illustrated in FIG. 6 is that material 22' may form the lower surface 24' of object 10', contacting principally cover 14'. Material 22' may be sewn to cover 14' or otherwise appropriately attached to it. In this configuration, material 22' functions as the principal external contact or bearing surface when object 10' is in use.

FIG. 4 shows other aspects of the exemplary deck kayak of object 10'. Unlike conventional canoes and kayaks, in which portions of the occupants' bodies are below the water line, object 10' lacks any recess in which an occupant may sit. Instead, upper surface 62 of object 10' is flat (or at least substantially so), so that an occupant sits on upper surface 62—above the water line rather than below it.

Object 10' may include backrest 66 or a similar component if desired. Backrest 66, as depicted in FIG. 4, additionally may be attached to and protrude upward from upper surface 62 so as to contact the back of a seated occupant of object 10'. FIG. 4 illustrates a system for attaching an exemplary backrest 66 in which fasteners 70 connect with D-rings or other tie-downs 74 extending from upper surface 62. Clear to those skilled in the art is that such a system permits backrest 66 to be detached and removed from upper surface 62 when appropriate or desired. Equally clear, moreover, is that backrest 66 may be connected to upper surface 62 in manners other than shown in FIG. 4.

Some embodiments of object 10' optionally include, on upper surface 62, one or more foot rests 78 or handles 82, cargo net 86, valve assemblies 90, and zipper 94. Foot rests 78, if present, typically are spaced from backrest 66 a distance approximately equal to the length of the legs of an average user of object 10'. They preferably are attached to upper surface 62 using material 22', although other attachment materials may be used instead. Although two valve assemblies 90 are shown in FIG. 4, permitting separate inflation of portions of chambers 14', more or fewer such assemblies 90 may be employed. Assemblies 90 optionally may include flaps 98 covering the valves themselves. Zipper 94, finally, permits removal of chambers 14' when opened.

Detailed in FIG. 5 is object 10", similar to object 10' except that it admits simultaneous use by two occupants. Indeed, object 10" may include two backrests 66 and two sets of foot rests 78, one for each of the two occupants. Object 10" otherwise may be configured substantially like object 10' and thus will not be discussed in any greater detail in this application.

The foregoing is provided for purposes of illustrating, explaining, and describing exemplary embodiments of the present invention. Modifications and adaptations to the illustrated and described embodiments will be apparent to those skilled in the relevant art and may be made without departing from the scope or spirit of the invention.

What is claimed is:

1. Inflatable object comprising:
   a. an inflatable chamber;
   b. a cover for at least part of the chamber; and
   c. an interface formed as a composite of the materials from which the cover and inflatable chamber are made and attachable to each of the chamber and cover.

2. Inflatable object according to claim 1 in which the cover is made of fabric.

3. Inflatable object according to claim 2 in which the chamber is made of polyvinyl chloride.

4. Inflatable object according to claim 3 in which the fabric is a material selected from the group consisting of polyester and nylon.

5. Inflatable object according to claim 4 in which the interface comprises a composite of polyvinyl chloride and the material.

6. Inflatable object according to claim 1 in the form of a sled.

7. Inflatable object according to claim 1 in the form of a kayak.

8. Inflatable object comprising:
   a. an inflatable chamber;
   b. a cover for at least part of the chamber; and
   c. an interface formed as a composite and sewn to the cover and welded to the chamber.

9. Inflatable object according to claim 8 in the form of a sled.

10. Inflatable object according to claim 8 in the form of a kayak.

11. Inflatable object comprising:
    a. an inflatable chamber;
    b. a cover for at least part of the chamber; and
    c. an interface (i) comprising a composite of a stranded first material and a meltable second material, with the second material melted so as to flow around strands of the first material and (ii) attachable to each of the chamber and cover.

* * * * *